US012629819B2

(12) United States Patent (10) Patent No.: US 12,629,819 B2
Wang et al. (45) Date of Patent: May 19, 2026

(54) METHOD AND SYSTEM FOR DEXTEROUS MANIPULATION BY A ROBOT

(71) Applicant: Honda Motor Co., Ltd., Tokyo (JP)

(72) Inventors: Changhao Wang, Berkeley, CA (US);
Rana Soltani Zarrin, Los Gatos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 18/414,084

(22) Filed: Jan. 16, 2024

(65) Prior Publication Data

US 2025/0065493 A1     Feb. 27, 2025

Related U.S. Application Data

(60) Provisional application No. 63/578,080, filed on Aug. 22, 2023.

(51) Int. Cl.
*B25J 9/16*          (2006.01)
*B25J 15/10*         (2006.01)
(52) U.S. Cl.
CPC ............. *B25J 9/1605* (2013.01); *B25J 15/10* (2013.01)
(58) Field of Classification Search
CPC ........ B25J 9/1605; B25J 15/10; B25J 9/1671; B25J 9/163; B25J 9/1664; G05B 2219/39298; G05B 2219/40311; G05B 19/41885; G05B 2219/40515; G05B 2219/39536
See application file for complete search history.

(56) References Cited

U.S. PATENT DOCUMENTS

| | | | |
|---|---|---|---|
| 9,649,764 B1 | 5/2017 | Sun et al. | |
| 11,097,418 B2 | 8/2021 | Nagarajan et al. | |
| 11,314,987 B2 | 4/2022 | Wohlhart et al. | |
| 12,138,805 B2 | 11/2024 | Sundermeyer et al. | |
| 12,164,299 B2* | 12/2024 | Passot ................. | G05D 1/0274 |

(Continued)

FOREIGN PATENT DOCUMENTS

DE        102020127508 B4      9/2022

OTHER PUBLICATIONS

Pepper.pdf (C. Pepper, S. Balakirsky, and C. Scrapper, Robot Simulation Physics Validation, Aug. 28-30, 2007, ACM, pp. 97-104) (Year: 2007).*

(Continued)

*Primary Examiner* — Bao Long T Nguyen
(74) *Attorney, Agent, or Firm* — Rankin, Hill & Clark LLP

(57)               ABSTRACT

A system for dexterous robot manipulation includes a first robot configured to perform real simulations with a real object, and at least one computer configured to perform a set of virtual simulations including a robot model and a virtual object corresponding to the first robot and the real object, and develop a trajectory of the robot model based on virtual simulation information of the robot model and the virtual object generated in the set of virtual simulations. The at least one computer is also configured to perform a set of real simulations including the first robot and the real object, wherein the first robot mimics the trajectory of the robot model, and develop a policy for robot maneuvering based on the set of real simulations, and deploy the policy to at least one of the first robot and a second robot to perform dexterous manipulation.

19 Claims, 10 Drawing Sheets

(56) References Cited

U.S. PATENT DOCUMENTS

| | | | |
|---|---|---|---|
| 12,172,328 | B1 | 12/2024 | Jiang et al. |
| 12,330,303 | B2 | 6/2025 | Gordon et al. |
| 2013/0116828 | A1 | 5/2013 | Krause et al. |
| 2015/0239121 | A1 | 8/2015 | Takeda |
| 2016/0059412 | A1 | 3/2016 | Oleynik |
| 2016/0199981 | A1 | 7/2016 | Atohira et al. |
| 2019/0221037 | A1 | 7/2019 | Sugaya |
| 2020/0101599 | A1 | 4/2020 | Yoshida |
| 2020/0189102 | A1 | 6/2020 | Sasajima |
| 2020/0306974 | A1 | 10/2020 | Fattey et al. |
| 2021/0086364 | A1 | 3/2021 | Handa et al. |
| 2021/0125052 | A1 | 4/2021 | Tremblay et al. |
| 2022/0009091 | A1 | 1/2022 | Moreno Noguer et al. |
| 2022/0032454 | A1 | 2/2022 | Yang et al. |
| 2022/0126447 | A1 | 4/2022 | Fu et al. |
| 2022/0134537 | A1 | 5/2022 | Chadalavada Vijay Kumar et al. |
| 2022/0404835 | A1 | 12/2022 | Gildert |
| 2022/0410395 | A1 | 12/2022 | Sugaya et al. |
| 2023/0321822 | A1 | 10/2023 | Narang et al. |
| 2024/0013542 | A1 | 1/2024 | Satoh |
| 2024/0017426 | A1 | 1/2024 | Sun et al. |
| 2024/0109188 | A1 | 4/2024 | Imamura |
| 2024/0416510 | A1 | 12/2024 | Aguirre et al. |
| 2025/0100141 | A1 | 3/2025 | Jain et al. |

OTHER PUBLICATIONS

TALON Tracked Military Robot—Army Technology.pdf (TALON Tracked Military Robot—Army Technology, 2020, https://www.army-technology.com/projects/talon-tracked-military-robot/, pp. 1-7) (Year: 2020).*

18414069_Claims_2024-01-16.pdf (claims of copending applicaton 18414069) (Year: 2025).*

S. Jin, C. Wang, and M. Tomizuka. Robust deformation model approximation for robotic cable manipulation. In 2019 IEEE/RSJ International Conference on Intelligent Robots and Systems (IROS), pp. 6586-6593. IEEE, 2019.

Y. Bai and C. K. Liu. Dexterous manipulation using both palm and fingers. In 2014 IEEE International Conference on Robotics and Automation (ICRA), pp. 1560-1565. IEEE, 2014.

T. Chen, J. Xu, and P. Agrawal. A system for general in-hand object re-orientation. In Conference on Robot Learning, pp. 297-307. PMLR, 2022.

C. Chi, B. Burchfiel, E. Cousineau, S. Feng, and S. Song. Iterative residual policy: for goal-conditioned dynamic manipulation of deformable objects. arXiv preprint arXiv:2203.00663, 2022.

R. Chitnis, S. Tulsiani, S. Gupta, and A. Gupta. Efficient bimanual manipulation using learned task schemas. In 2020 IEEE International Conference on Robotics and Automation (ICRA), pp. 1149-1155. IEEE, 2020.

A. Gupta, C. Eppner, S. Levine, and P. Abbeel. Learning dexterous manipulation for a soft robotic hand from human demonstrations. In 2016 IEEE/RSJ International Conference on Intelligent Robots and Systems (IROS), pp. 3786-3793. IEEE, 2016.

L. Han and J. C. Trinkle. Dextrous manipulation by rolling and finger gaiting. In Proceedings. 1998 IEEE International Conference on Robotics and Automation (Cat. No. 98CH36146), vol. 1, pp. 730-735. IEEE, 1998.

V. Kumar, E. Todorov, and S. Levine. Optimal control with learned local models: Application to dexterous manipulation. In 2016 IEEE International Conference on Robotics and Automation (ICRA), pp. 378-383. IEEE, 2016.

A. Kumar, Z. Fu, D. Pathak, and J. Malik. Rma: Rapid motor adaptation for legged robots. arXiv preprint arXiv:2107.04034, 2021.

J. Li, X. Liu, B. Zhu, J. Jiao, M. Tomizuka, C. Tang, and W. Zhan. Guided online distillation: Promoting safe reinforcement learning by offline demonstration. arXiv preprint arXiv:2309.09408, 2023.

V. Lim, H. Huang, L. Y. Chen, J. Wang, J. Ichnowski, D. Seita, M. Laskey, and K. Goldberg. Real2sim2real: Self-supervised learning of physical single-step dynamic actions for planar robot casting. In 2022 International Conference on Robotics and Automation (ICRA), pp. 8282-8289, 2022. doi:10.1109/ICRA46639.2022.9811651.

Y. Narang, K. Storey, I. Akinola, M. Macklin, P. Reist, L. Wawrzyniak, Y. Guo, A. Mora-vanszky, G. State, M. Lu, et al. Factory: Fast contact for robotic assembly. arXiv preprint arXiv:2205.03532, 2022.

H. Qi, A. Kumar, R. Calandra, Y. Ma, and J. Malik. In-hand object rotation via rapid motor adaptation. In Conference on Robot Learning, pp. 1722-1732. PMLR, 2023.

H. Qi, B. Yi, S. Suresh, M. Lambeta, Y. Ma, R. Calandra, and J. Malik. General in-hand object rotation with vision and touch. arXiv preprint arXiv:2309.09979, 2023.

D. Rus. In-hand dexterous manipulation of piecewise-smooth 3-d objects. The International Journal of Robotics Research, 18(4):355-381, 1999.

J.-P. Saut, A. Sahbani, S. El-Khoury, and V. Perdereau. Dexterous manipulation planning using probabilistic roadmaps in continuous grasp subspaces. In 2007 IEEE/RSJ International Conference on Intelligent Robots and Systems, pp. 2907-2912. IEEE, 2007.

Y. Sun, W. L. Ubellacker, W.-L. Ma, X. Zhang, C. Wang, N. V. Csomay-Shanklin, M. Tomizuka, K. Sreenath, and A. D. Ames. Online learning of unknown dynamics for model-based controllers in legged locomotion. IEEE Robotics and Automation Letters, 6(4):8442-8449, 2021.

E. Todorov, T. Erez, and Y. Tassa. Mujoco: A physics engine for model-based control. In 2012 IEEE/RSJ Int. Conf. on Intelligent Robots and Syst., pp. 5026-5033. IEEE, 2012.

H. Van Hoof, T. Hermans, G. Neumann, and J. Peters. Learning robot in-hand manipulation with tactile features. in 2015 ieee-ras 15th international conference on humanoid robots (humanoids). IEEE, 34:121-127, 2015.

C. Wang, Y. Zhang, X. Zhang, Z. Wu, X. Zhu, S. Jin, T. Tang, and M. Tomizuka. Offline-online learning of deformation model for cable manipulation with graph neural networks. IEEE Robotics and Automation Letters, 7(2):5544-5551, 2022.

M. Yu, K. Lv, C. Wang, M. Tomizuka, and X. Li. A coarse-to-fine framework for dual-arm manipulation of deformable linear objects with whole-body obstacle avoidance. In 2023 IEEE International Conference on Robotics and Automation (ICRA), pp. 10153-10159. IEEE, 2023.

X. Zhang, S. Jain, B. Huang, M. Tomizuka, and D. Romeres. Learning generalizable pivoting skills. arXiv preprint arXiv:2305.02554, 2023.

X. Zhang, C. Wang, L. Sun, Z. Wu, X. Zhu, and M. Tomizuka. Efficient sim-to-real transfer of contact-rich manipulation skills with online admittance residual learning. arXiv preprint arXiv:2310.10509, 2023. .

W. Zhou and D. Held. Learning to grasp the ungraspable with emergent extrinsic dexterity. In ICRA 2022 Workshop: Reinforcement Learning for Contact-Rich Manipulation, 2022. URL https://openreview.net/forum?id=Zrp4wpa9lqh.

Office Action of U.S. Appl. No. 18/414,047 dated Aug. 19, 2025, 27 pages.

Office Action of U.S. Appl. No. 18/414,069 dated Aug. 5, 2025, 44 pages.

C. C. Beltran-Hernandez, D. Petit, I. G. Ramirez-Alpizar, and K. Harada. Variable compliance control for robotic peg-in-hole assembly: A deep-reinforcement-learning approach. Applied Sciences, 10(19):6923, 2020.

Y. Chebotar, A. Handa, V. Makoviychuk, M. Macklin, J. Issac, N. Ratliff, and D. Fox. Closing the sim-to-real loop: Adapting simulation randomization with real world experience. In 2019 International Conference on Robotics and Automation (ICRA), pp. 8973-8979. IEEE, 2019.

Lennart Ljung. 1999. System identification (2nd ed.): theory for the user. Prentice Hall PTR, USA.

Office Action of U.S. Appl. No. 18/414,069 dated Nov. 5, 2025, 44 pages.

* cited by examiner

500

502 — Perform a set of virtual simulations

504 — Develop a trajectory of a robot model

510 — Perform a set of real simulations

512 — Develop a policy for robot maneuvering

514 — Deploy the policy to a robot

METHOD AND SYSTEM FOR DEXTEROUS MANIPULATION BY A ROBOT

BACKGROUND

Dexterous manipulation is a routine part of operating handheld tools and other objects. In this regard, many handheld tools and objects may be held and operated with a grasp that is different from a grasp used for picking the tool up. Further, other types of handheld tools and objects are otherwise configured for being gripped in a variety of ways to perform work.

To turn a nut using a wrench, for example, a robotic end effector may first pick up the wrench using fingertips and then pull the wrench closer to the palm while transitioning to a power grasp so that a larger force may be applied. As such, it is often useful to change the grasp along with an object pose relative to an end effector between picking up and using the tool (e.g., in-hand manipulation).

Dexterous manipulation skills are often important, for example, in household and factory scenarios, where varieties of tasks call for a variety of handheld tools to perform work. However, there are existing challenges to obtaining robust dexterous manipulation skills in a robotic system.

For example, methods which squarely employ virtual models to learn dexterous manipulation skills are inefficient for real-time computation, often use inaccurate models for emulating real tasks, and are not robust with respect to sensor noise. Furthermore, reinforcement learning methods which squarely employ real simulations are too time consuming to train and have a large sim-to-real gap. Challenges to deploying learned dexterous manipulation skills on the real robot further arise from the sim-to-real gap, imperfect controllers, and noisy sensor measurements.

Consequently, there is demand for robotic systems with improved dexterous manipulation skills. Limitations and disadvantages of conventional and traditional approaches will become apparent to one of skill in the art, through comparison of described systems with some aspects of the present disclosure, as set forth in the remainder of the present application and with reference to the drawings.

BRIEF DESCRIPTION

According to one aspect, a system for dexterous robot manipulation includes a first robot configured to perform real simulations with a real object, and at least one computer configured to perform a set of virtual simulations including a robot model and a virtual object corresponding to the first robot and the real object, and develop a trajectory of the robot model based on virtual simulation information of the robot model and the virtual object generated in the set of virtual simulations. The at least one computer is also configured to perform a set of real simulations including the first robot and the real object, where the first robot mimics the trajectory of the robot model, and develop a policy for robot maneuvering based on the set of real simulations, and deploy the policy to at least one of the first robot and a second robot to perform dexterous manipulation.

According to another aspect, a method for dexterous robot manipulation includes performing a set of virtual simulations including a robot model and a virtual object, and developing a trajectory of the robot model based on virtual simulation information of the robot model and the virtual object generated in the set of virtual simulations. Performing a set of real simulations including the first robot, where the first robot mimics the trajectory of the robot model, developing a policy for robot maneuvering based on the set of real simulations, and deploying the policy to at least one of the first robot and a second robot to perform dexterous manipulation.

According to another aspect, a non-transitory computer readable storage medium stores instructions that, when executed by a computer having a processor, causes the processor to perform a method. The method includes performing a set of virtual simulations including a robot model and a virtual object, and developing a trajectory of the robot model based on virtual simulation information of the robot model and the virtual object generated in the set of virtual simulations. The method also includes performing a set of real simulations including the first robot, where the first robot mimics the trajectory of the robot model, developing a policy for robot maneuvering based on the set of real simulations, and deploying the policy to at least one of the first robot and a second robot to perform dexterous manipulation.

DETAILED DESCRIPTION

Figure 1:
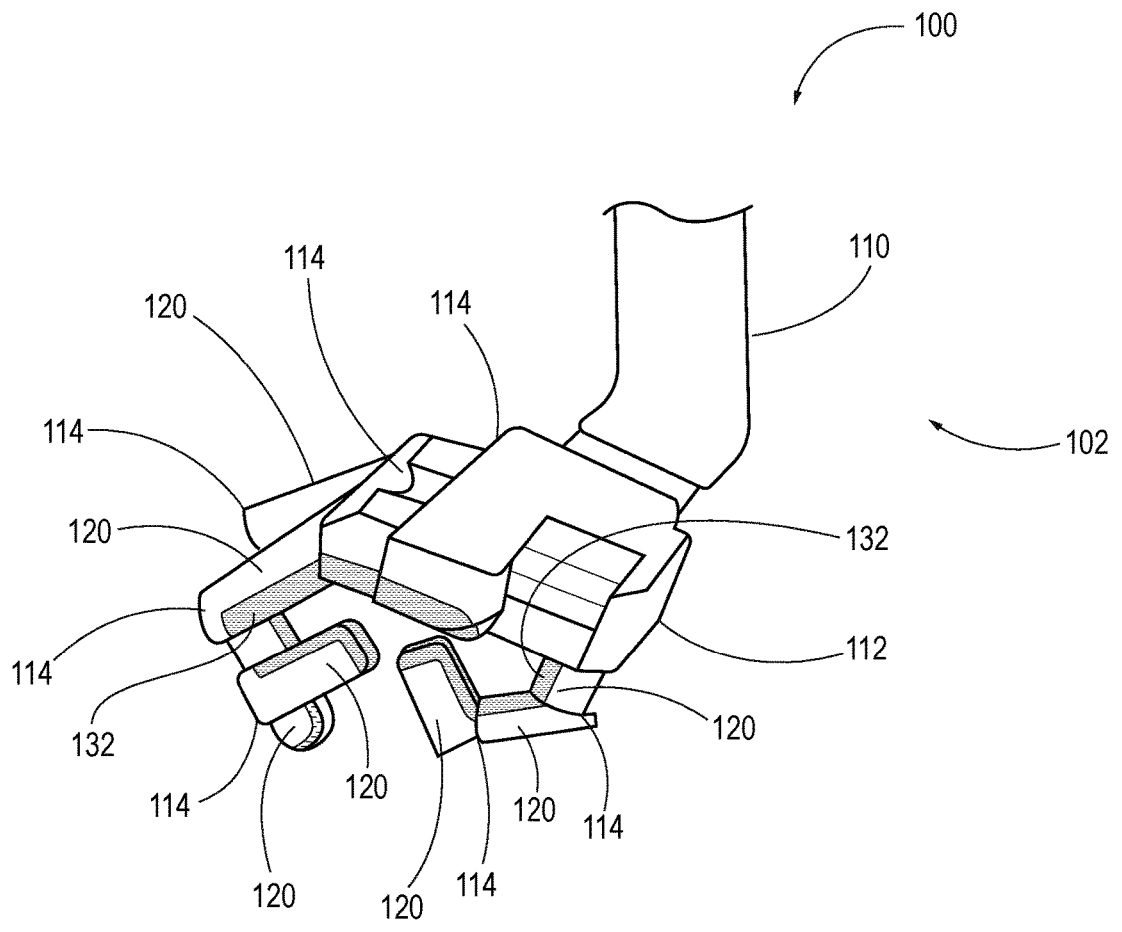
FIG. 1 is a perspective view of a virtual simulation including a robot model and a virtual object in a virtual initial position.
Figure 1:
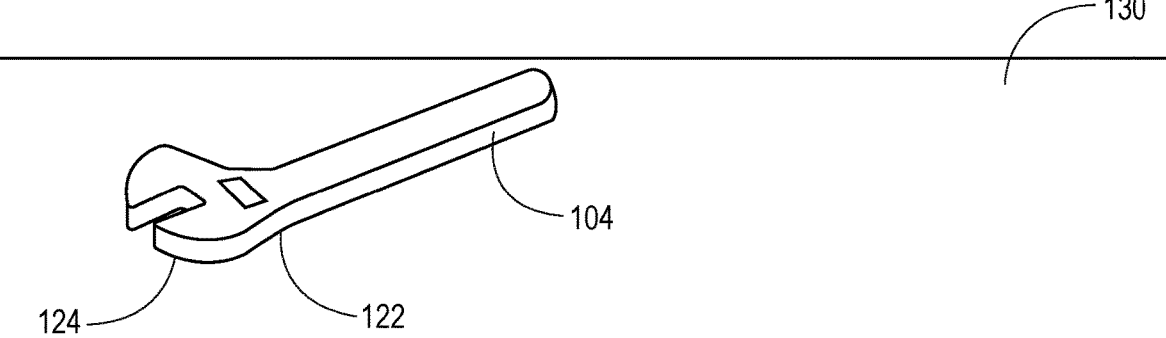

The systems and methods disclosed herein are configured to obtain dexterous manipulation skills for a robotic system. A set of virtual simulations is performed using a robot model and a virtual object to generate a trajectory using a model-based planner. A set of real simulations is performed using a first robot and real object, where the first robot mimics the trajectory of the robot model. Data generated in the set of real simulations is processed to develop a policy for robot maneuvering. The policy may be deployed to at least one of the first robot and a second robot to perform work in a real world application.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Exemplary wearable computing devices can include, but are not limited to, watches, glasses, clothing, gloves, hats, shirts, jewelry, rings, earrings necklaces, armbands, leashes, collars, shoes, earbuds, headphones and personal wellness devices.

System Overview

Figure 2:
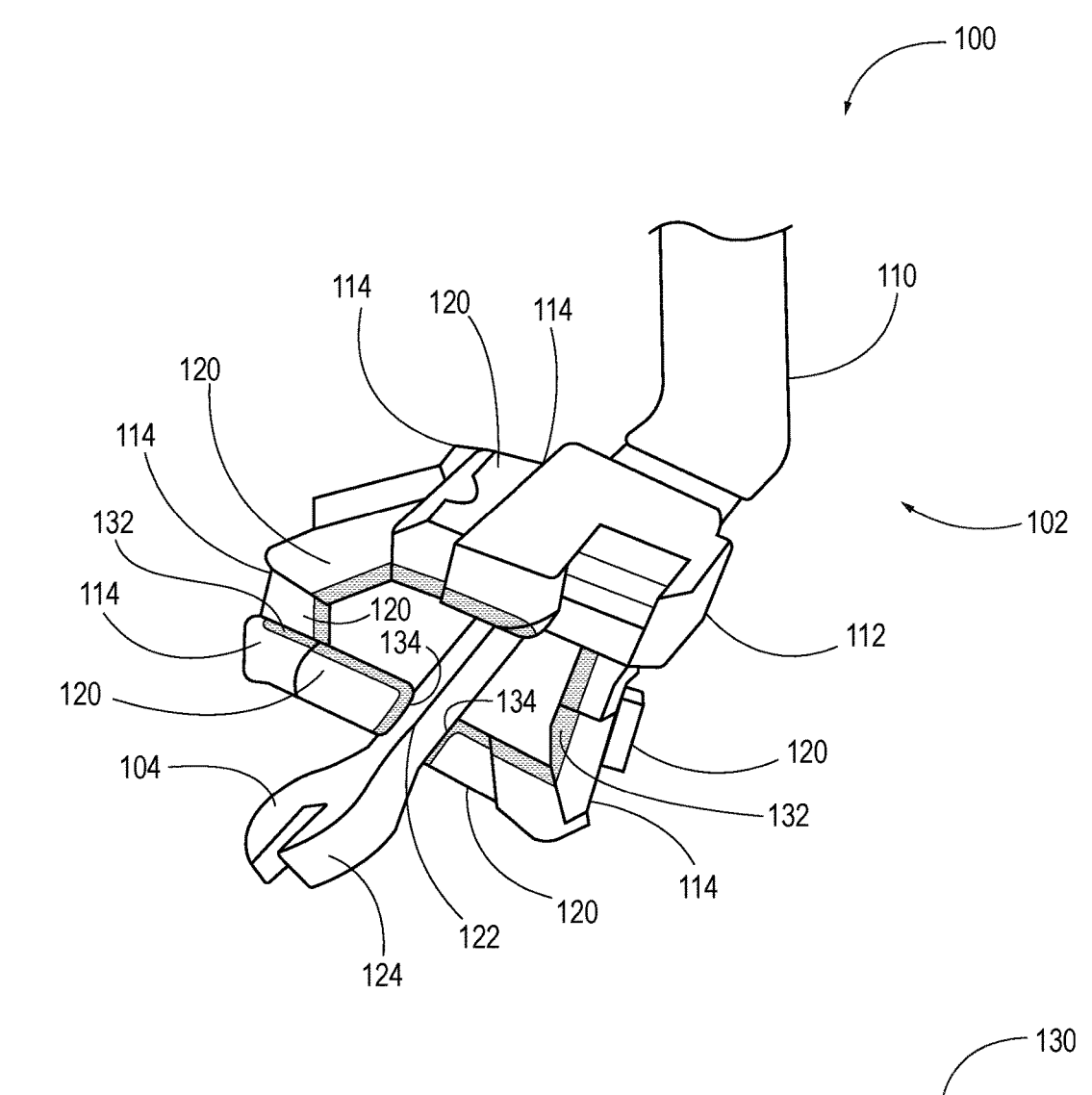
FIG. 2 is a perspective view of the virtual simulation including the robot model and the virtual object in a virtual intermediate position.
Figure 3:
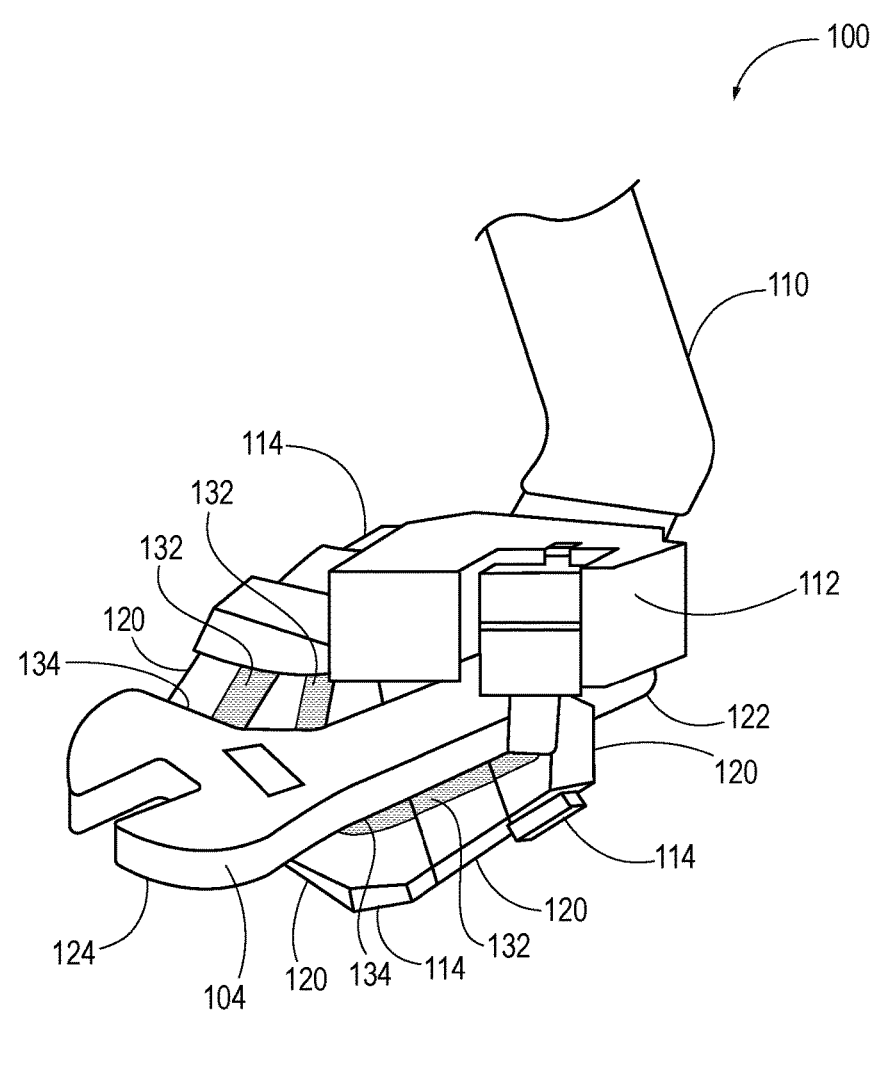
FIG. 3 is a perspective view of the virtual simulation including the robot model and the virtual object in a virtual target position.

Referring now to the drawings, the drawings are for purposes of illustrating one or more exemplary embodiments and not for purposes of limiting the same. FIGS. 1-3 depict a virtual simulation 100 including a robot model 102 and a virtual object 104, where the robot model 102 adopts a virtual target position from a virtual initial position.

The robot model 102 includes a robotic arm 110 connected with a robotic hand 112 configured for grabbing the virtual object 104. In this manner, the robot model 102 simulates an end effector capable of manipulating the virtual object 104 in the virtual simulation 100.

The robotic arm 110 and the robotic hand 112 are each formed from rotating joints 114 and rigid connecting portions 120 having interrelated positions and orientations in a virtual space which enable maneuvering the robot model 102 for gripping and manipulating the virtual object 104. While, in the depicted embodiment, the robot model 102 includes the robotic arm 110 and the robotic hand 112 as an end effector, the robot model 102 may alternatively or additionally include various types of end effectors capable of manipulating the virtual object 104 without departing from the scope of the present disclosure.

The virtual object 104 includes a handle 122 extended from a tool end portion 124. The handle 122 is elongated and configured for being grabbed by the robot model 102, where the robotic hand 112 picks up the handle 122, and repositions the handle 122 for operating the virtual object 104. While, in the depicted embodiment, the virtual object 104 is a wrench and the tool end portion 124 is a wrench head, the virtual object 104 may alternatively or additionally include a variety of handheld items, tools, and devices without departing from the scope of the present disclosure. In this regard, the virtual object 104 may be kitchen equipment such as a spatula, a spoon, and a knife, machining equipment such as a hammer, a saw, and a drill, and assembly components such as nuts, bolts, and screws. Further, while in the depicted embodiment the virtual object 104 includes the handle 122, the virtual object 104 may alternatively lack a handle, and be manipulated directly by the robot model 102 without departing from the scope of the present disclosure.

FIG. 1 depicts the robot model 102 in the virtual initial position, where the robot model 102 is located above the virtual object 104, and the virtual object 104 is at rest on a virtual floor 130. FIG. 2 depicts the robot model 102 in a virtual intermediate position, where the robotic hand 112 is grabbing the handle 122 in a first position corresponding to picking the virtual object 104 off the virtual floor 130.

FIG. 3 depicts the robot model 102 in the virtual target position, where the robotic hand 112 is gripping the handle 122 in a second position for operating the virtual object 104. Notably, a pose and a position of the handle 122 changes relative to a pose and a position of the robot model 102 as the virtual object 104 moves from the first position toward the second position.

In an embodiment, the virtual simulation 100 begins with the robotic hand 112 gripping the virtual object 114 in a virtual initial position as shown in FIG. 2. In such an embodiment, both the virtual initial position and the virtual target position of the robot model 102 include grabbing the virtual object 104. With this construction, a policy for robot maneuvering developed based on the virtual simulation 100 is relatively focused toward in-hand manipulation of an object, thereby improving an efficacy of the virtual simulation 100 and policy output described below without requiring additional computational resources.

With reference to FIGS. 1-3, the robot model 102 includes virtual tactile sensors 132 configured to generate tactile data during the set of virtual simulations 100. The virtual tactile sensors 132 support a plurality of taxels arranged in three-dimensional space on the virtual robotic hand 112, including on the joints 114 and the connecting portions 120. The virtual tactile sensors 132 are curved to form an end effector on the virtual robotic hand 112 functional as robotic digits, joints, and fingertips for manipulating a variety of objects including the virtual object 104.

As shown in FIGS. 2 and 3, the virtual tactile sensors 132 are respectively configured to detect a force generated at contact locations 134 between the virtual tactile sensor 132 and the virtual object 104. The contact locations 134 are locations on the virtual object 104 where the robot model 102 contacts the virtual object 104. In this regard, each taxel supported on the virtual tactile sensors 132 is configured to generate a taxel signal indicating a direction and a force generated at the taxel, in the contact locations 134, when the virtual tactile sensor 132 contacts the virtual object 104.

In the depicted embodiment, each taxel supported on the virtual tactile sensors 132 is respectively configured to detect a linear force normal to an outer surface of the supporting virtual tactile sensor 132. In embodiments, each virtual tactile sensor 132 may additionally or alternatively detect up to three perpendicular linear forces including the normal linear force, and additionally or alternatively detect up to three perpendicular rotational forces. Each taxel supported on the virtual tactile sensors 132 is configured to detect an amount of a force generated at the contact area 134.

The set of virtual simulations 100 generates virtual simulation information that indicates the contact locations 134 on the virtual object 104. The virtual simulation information 302 may indicate a variety of combinations of contact locations, including singular contact locations, utilized by the robot model 102 in a sequence in each iteration of the set of virtual simulations 100 as the robot model 102 adopts the virtual target position from the virtual initial position. The virtual simulation information also indicates at least one of a pose and a position of the virtual robotic hand 112 and the virtual object 104 in the set of virtual simulations 100.

The set of virtual simulations 100 may include a plurality of iterations where the robot model 102 adopts a variety of virtual target positions from a variety of virtual initial positions, resulting in a variety of task-specific trajectories taken by the robot model 102. With this construction, a policy developed based on the set of virtual simulations 100 enables a robot to perform a variety of tasks. Alternatively, the set of virtual simulations 100 may include one iteration, such that a policy developed based on the set of virtual simulations 100 enables a robot to perform a corresponding task using relatively fewer computational resources.

Figure 4:
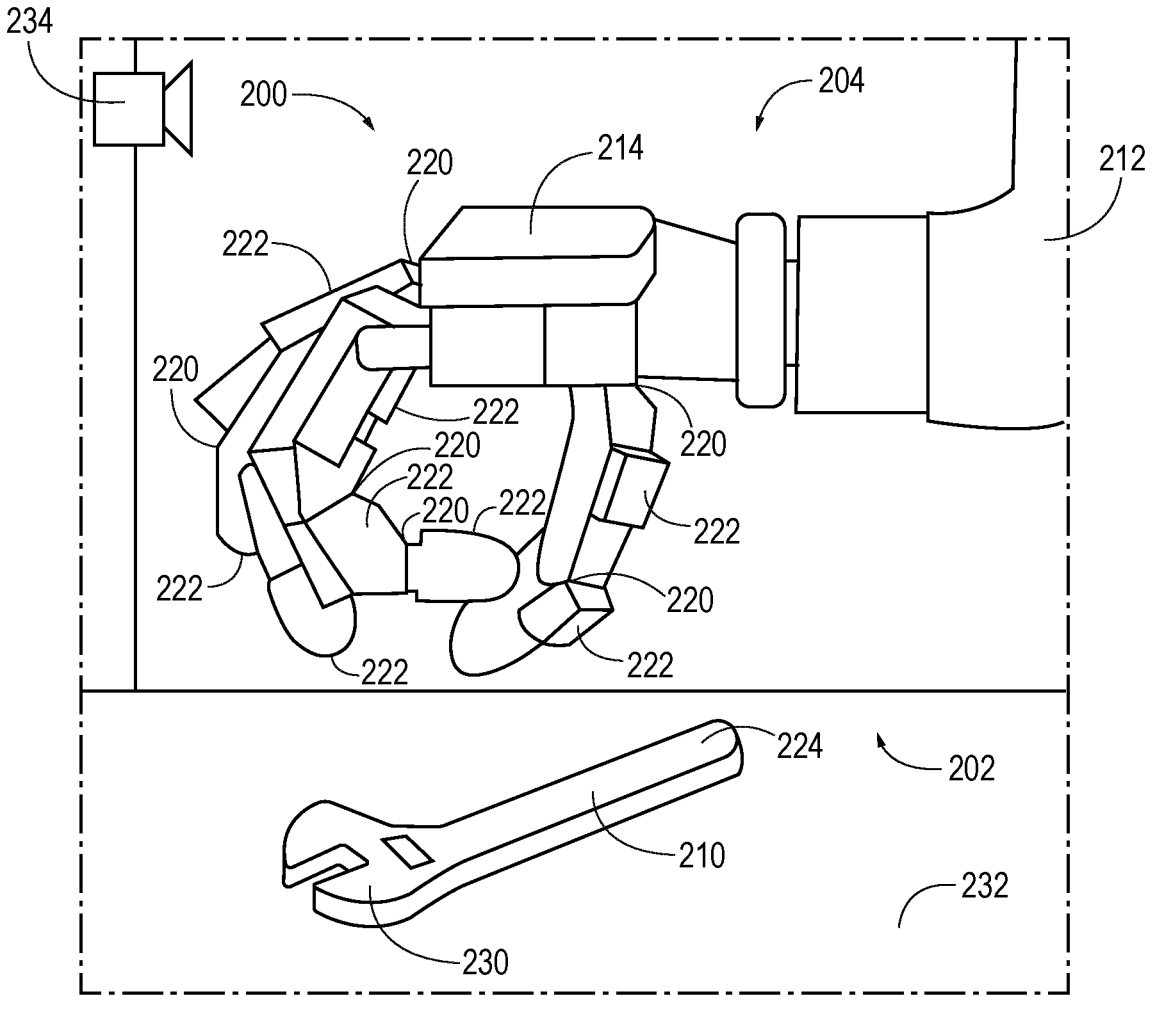
FIG. 4 is a perspective view of a test apparatus including a first robot and a real object in a real initial position.
Figure 5:
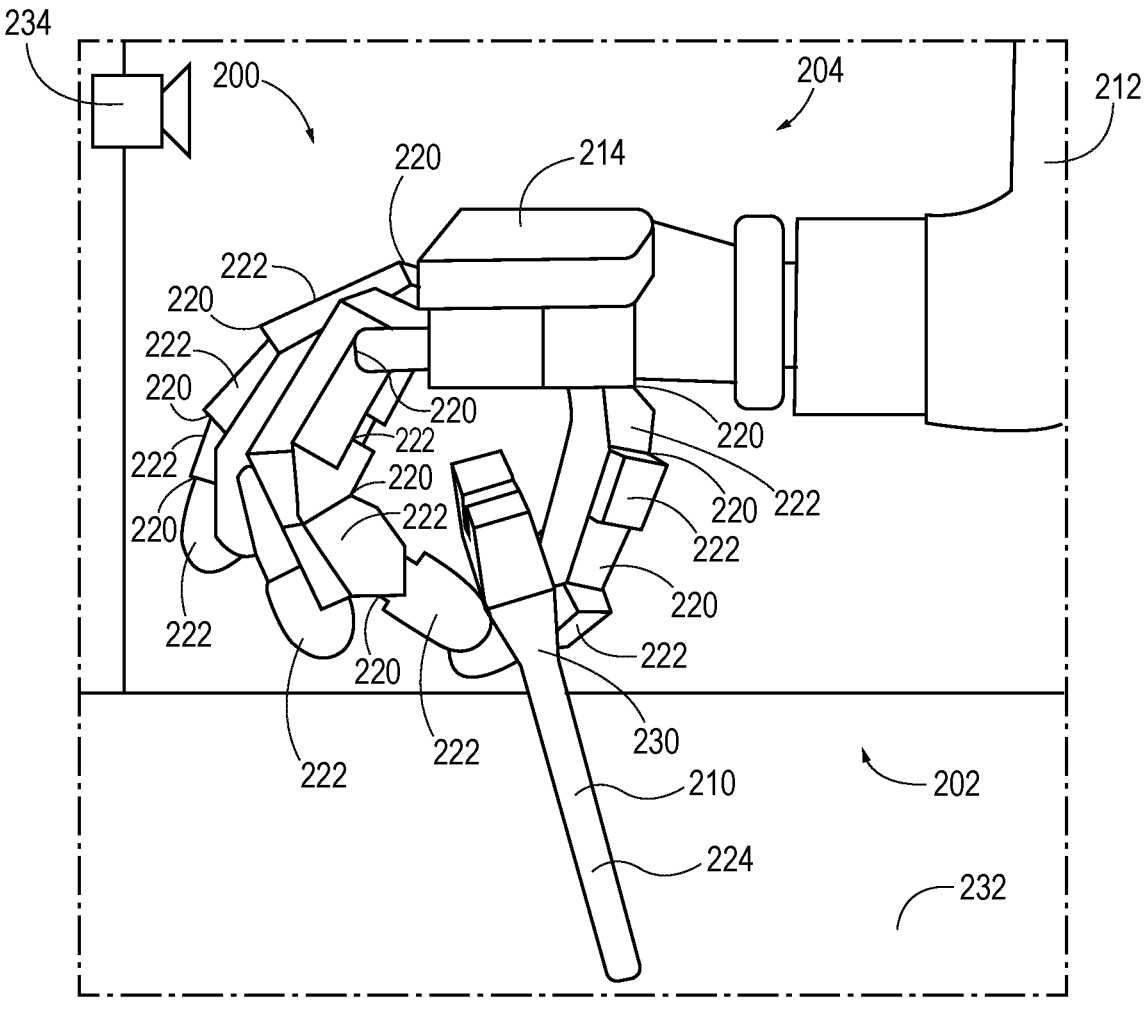
FIG. 5 is a perspective view of the test apparatus including the first robot and the real object in a real intermediate position.
Figure 6:
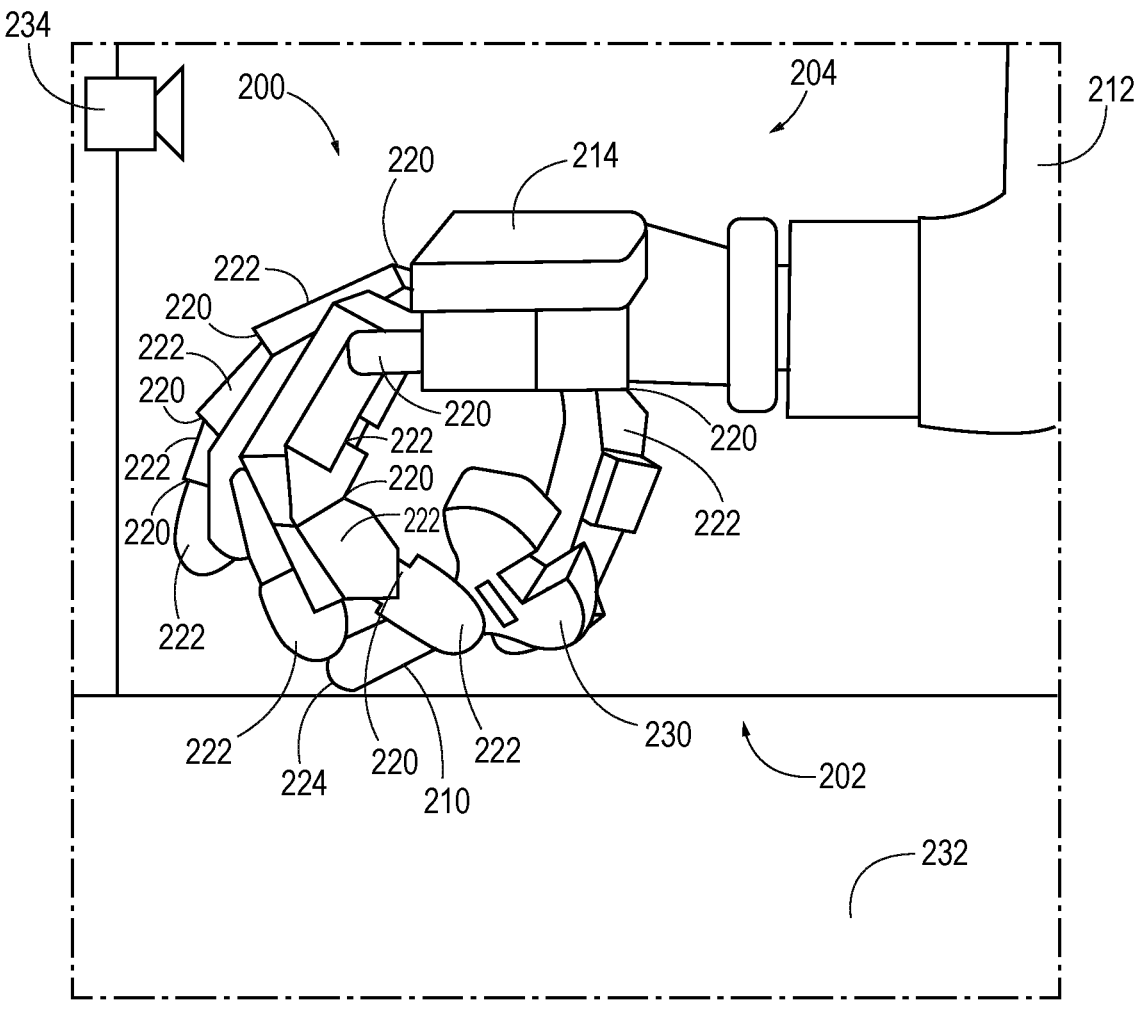
FIG. 6 is a perspective view of the test apparatus including the first robot and the real object in a real target position.

FIGS. 4-6 depict a set of real simulations 200 performed with a test apparatus 202 including a first robot 204 and a real object 210, where the first robot 204 adopts a real target position from a real initial position. The set of virtual simulations 100 corresponds to the first set of real simulations 200, where the robot model 102 simulates the first robot 204, and the virtual object 104 simulates the real object 210.

The first robot 204 includes a robotic arm 212 connected with a robotic hand 214 configured for grabbing the real object 210. In this manner, the first robot 204 is an end effector capable of manipulating the real object 210 in the first set of real simulations 200.

The robotic arm 212 and the robotic hand 214 are each formed from rotating joints 220 and rigid connecting portions 222 having interrelated positions and orientations in a real space which enables maneuvering the first robot 204 for grabbing and manipulating the real object 210. While, in the depicted embodiment, the first robot 204 includes the robotic arm 212 and the robotic hand 214 as an end effector, the first robot 204 may alternatively or additionally include various types of end effectors capable of grabbing and manipulating the real object 210 without departing from the scope of the present disclosure.

The real object 210 includes a handle 224 extended from a tool end portion 230. The handle 224 is elongated and configured for being gripped by the first robot 204, where the robotic hand 214 picks up the real object 210 by the handle 224, and repositions the handle 224 with respect to the joints 220 and connecting portions 222 for operating the real object 210. While, in the depicted embodiment, the real object 210 is a wrench and the tool end portion 230 is a wrench head, the real object 210 may alternatively or additionally include a variety of handheld items, tools, and devices corresponding to the virtual object 104 without departing from the scope of the present disclosure. In this regard, the real object 210 may be kitchen equipment such as a spatula, a spoon, and a knife, machining equipment such as a hammer, a saw, and a drill, and assembly components such as nuts, bolts, and screws. Further, while in the depicted embodiment the real object 210 includes the handle 224, the real object 210 may alternatively lack a handle, and be manipulated directly by the first robot 204 without departing from the scope of the present disclosure.

FIG. 4 depicts the first robot 204 in the real initial position, where the first robot 204 is located above the real object 210, and the real object 210 is at rest on a floor 232. FIG. 5 depicts the first robot 204 in a real intermediate position, where the robotic hand 214 is grabbing the handle 224 in a first position corresponding to picking the real object 210 off the floor 232.

FIG. 6 depicts the first robot 204 in the real target position, where the robotic hand 214 is grabbing the handle 224 in a second position for operating the real object 210. Notably, a pose and a position of the handle 224 changes relative to a pose and a position of the first robot 204 as the real object 210 moves from the first position toward the second position.

In an embodiment, the set of real simulations 200 begins with the robotic hand 214 grabbing the real object 210 in a real initial position as shown in FIG. 5. In such an embodiment, both the initial real position and the real target position of the first robot 204 include grabbing the real object 210. With this construction, a policy of maneuvering a robot derived based on the first set of real simulations 200 is relatively focused toward in-hand manipulation of the real object 210, thereby improving an efficacy of the first set of real simulations 200 for developing a policy for robot maneuvering without requiring additional computational resources.

The first set of real simulations 200 includes a sensor 234 configured to generate sensor data of the first robot 102 and the real object 104. The sensor data indicates a position and a pose of the first robot 102 and the real object 104 during the first set of real simulations 200.

As depicted, the sensor 234 is a camera configured to capture image data as the sensor data indicating the positions and the orientations of the joints 220, the connecting portions 222, and the real object 104 in the first set of real simulations 200. While, as depicted, the sensor 234 is a camera, the sensor 234 may additionally or alternatively include a variety of sensors including potentiometers, encoders, transformers, Hall effect sensors, Eddy current sensors, piezoelectric sensors, and other sensors configured to generate data indicating the positions and orientations of the first robot 102 and the real object 104 in the first set of real simulations 200 without departing from the scope of the present disclosure.

Figure 7:
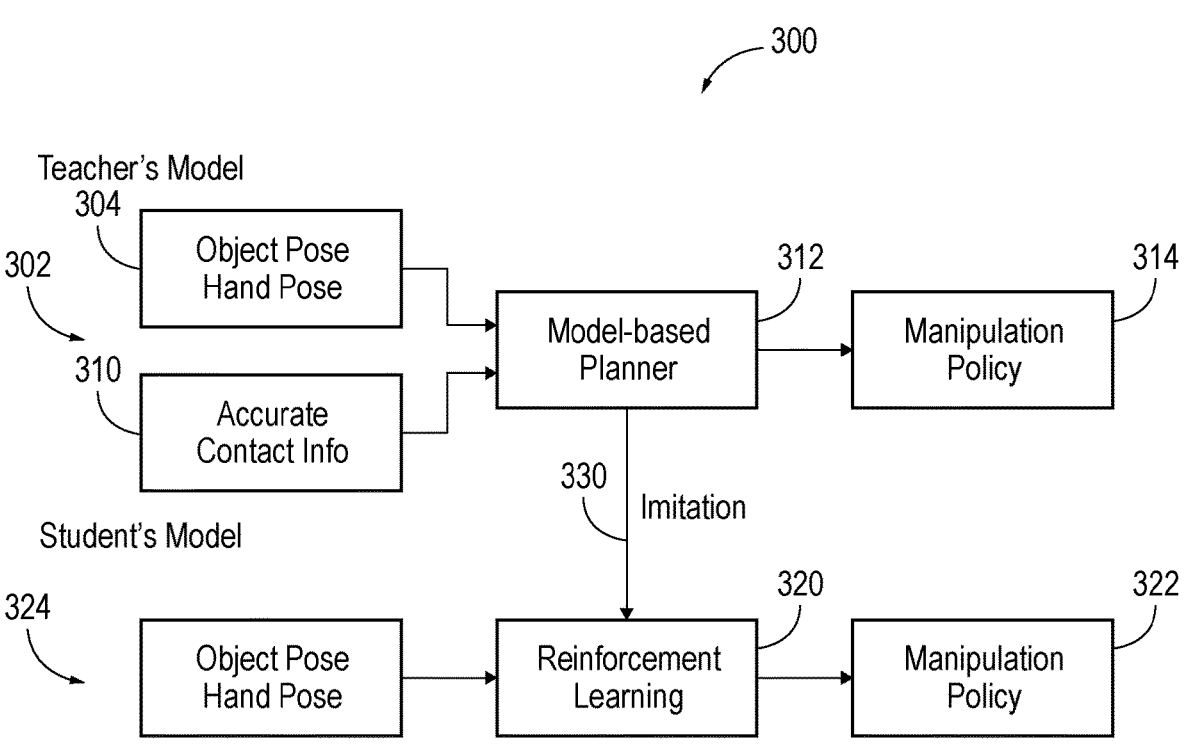
FIG. 7 is a diagram of a learning framework for dexterous manipulation by a robot.

FIG. 7 depicts a learning framework 300 for dexterous manipulation by a robot operating a tool. The learning framework 300 incorporates the set of virtual simulations 100 and the set of real simulations 200 to develop a policy for maneuvering a robot.

As shown in FIG. 7, the set of virtual simulations 100 generates virtual simulation information 302 including virtual tactile data 304 that indicates tactile data from the virtual tactile sensors 132. The virtual simulation information 302 also includes virtual simulation data 310 recorded directly from the set of virtual simulations 100, indicating the pose and the position of both the virtual robotic hand 112 and the virtual object 104 in the set of virtual simulations 100.

The learning framework 300 includes a model-based planning module 312 configured for receiving the virtual tactile data 304 and the virtual simulation data 310 for determining an optimal manipulation sequence including a trajectory 314 for the robot model 102 adopting the virtual target position from the virtual initial position. Notably, because the virtual tactile data 304 and the virtual simulation data 310 are generated computationally in the set of virtual simulations 100, the virtual tactile data 304 and the virtual simulation data 310 are generated without sensor noise and other influence from environmental factors that cause inaccurate data measurements. As such, the model-based planner 312 develops the optimal trajectory of the robot model 102 in the set of virtual simulations 100 based on relatively accurate position and contact information describing the robot model 102 and the virtual object 104, as compared to simulation information that may be generated in a real test setup such as the test apparatus 202.

The learning framework 300 includes a reinforcement learning module 320 configured to develop a policy 322 for robot maneuvering based on the trajectory of the robot model 102 in the set of virtual simulations 100, and based on real simulation information 324 generated in the set of real simulations 200. In this regard, the reinforcement learning module 320 is configured to receive the virtual simulation information 302 including the trajectory 314 from the model-based planning module 312, indicated by an arrow 330.

The reinforcement learning module 320 is configured to perform the set of real simulations 200 with the test apparatus 202, where the first robot 204 mimics the trajectory 314 of the robot model 102 from the set of virtual simulations 100 with the real object 210. The real simulation information 324 generated in the set of real simulations 200 includes real simulation data 334 generated by the sensor 234, indicating the pose and the position of the real robotic hand 214 and the real object 210 in the set of real simulations 200.

In developing the policy 322, the reinforcement learning module 320 also causes the first robot 204 to mimic a sequence of the contact locations 134 determined in the set of virtual simulations 100 as the robot model 102 adopts the virtual target position from the virtual initial position. The reinforcement learning module 320 employs a machine learning algorithm that processes the virtual simulation information 302 including the trajectory 314, the contact locations 134, the virtual tactile data 304, and the pose and the position data of the robot model 102 and the virtual object 104 to cause the first robot 204 to mimic the trajectory 314 and the sequential combination of the contact locations 134 employed by the robot model 102 in the set of virtual simulations 100 with the real object 210.

The real initial position of the real robotic hand 214 and the real object 210 is randomized over the set of real simulations 200. As such, the real initial position of the real robotic hand 214 and the real object 210 is inconsistent among iterations of the set of real simulations 200.

The second reinforcement learning module 320 is configured to develop the policy 322 over the iterations in the set of real simulations 200, incorporating trajectories of the first robot 204 and the real object 210 from the inconsistent real initial positions. In this manner, the policy 322 produced by the second machine learning algorithm is focused toward adapting the real target position from a random initial position, and is relatively adapted toward real-world applications of a robot as compared to a policy that requires a specific and fixed initial position.

The virtual target position in the set of virtual simulations 100 disposes the robot model 102 and the virtual object 104 in a same pose and a same position as the real target position of the first robot 204 and the real object 210 in the set of real simulations 200. As such, policies produced from the set of virtual simulations 100 and the set of real simulations 200 are both relatively focused toward specific actions, such as picking up and operating a hand tool, as compared to a policy developed based on moving the robot model 102 and the virtual object 104 toward a distinct or otherwise unrelated target position.

In developing the policy 322, the machine learning algorithm incorporates a distance incentive structure that reduces a distance between the first robot 204 and the real target position in the set of real simulations 200, based on the real simulation information 324. With this construction, the machine learning algorithm is configured to measure an accuracy in positioning the first robot 204 and the real object 210 with respect to the real target position for developing the policy 322. In this manner, the machine learning algorithm is configured to develop the policy 322 based on the pose and the position of the real robot 204, including real robotic hand 214 in the real set of simulations 200. In an embodiment, the machine learning algorithm is further configured to develop the policy 322 based on the pose and the position of the real robot 204 relative to the pose and the position of the real object 210 in the real set of simulations 200.

The machine learning algorithm also incorporates a movement incentive structure that reduces movement of the first robot 204 in adopting the real target position from the real initial position. With this construction, the machine learning algorithm is configured to produce the policy 322 in a manner that smooths a trajectory of a robot and an object manipulated by the robot, thereby reducing a tendency of the robot to drop the object.

The machine learning algorithm also incorporates a force incentive structure that reduces forces applied to the real object 210 by the first robot 204. With this construction, the machine learning algorithm is configured to produce the policy 322 in a manner that avoids applying unnecessary or excessive forces applied by a robot on an object manipulated by the robot, thereby reducing a tendency for damaging the object and pushing the object from a grip of the robot.

The machine learning algorithm also incorporates at least one smoothness incentive that reduces an acceleration of the first robot 204 and the real object 210. In this regard, the machine learning algorithm incorporates a first smoothness incentive structure that reduces an acceleration of the joints 220 and the connecting portions 222 forming the first robot 204 in the set of real simulations 200. The machine learning algorithm also incorporates a second smoothness incentive structure that reduces an acceleration of the real object 210 in the set of real simulations 200. With this construction, the machine learning algorithm is configured to produce the policy 322 in a manner which limits acceleration of a robot and an object manipulated by the robot, thereby reducing a tendency of the robot to drop the object.

Figure 8:
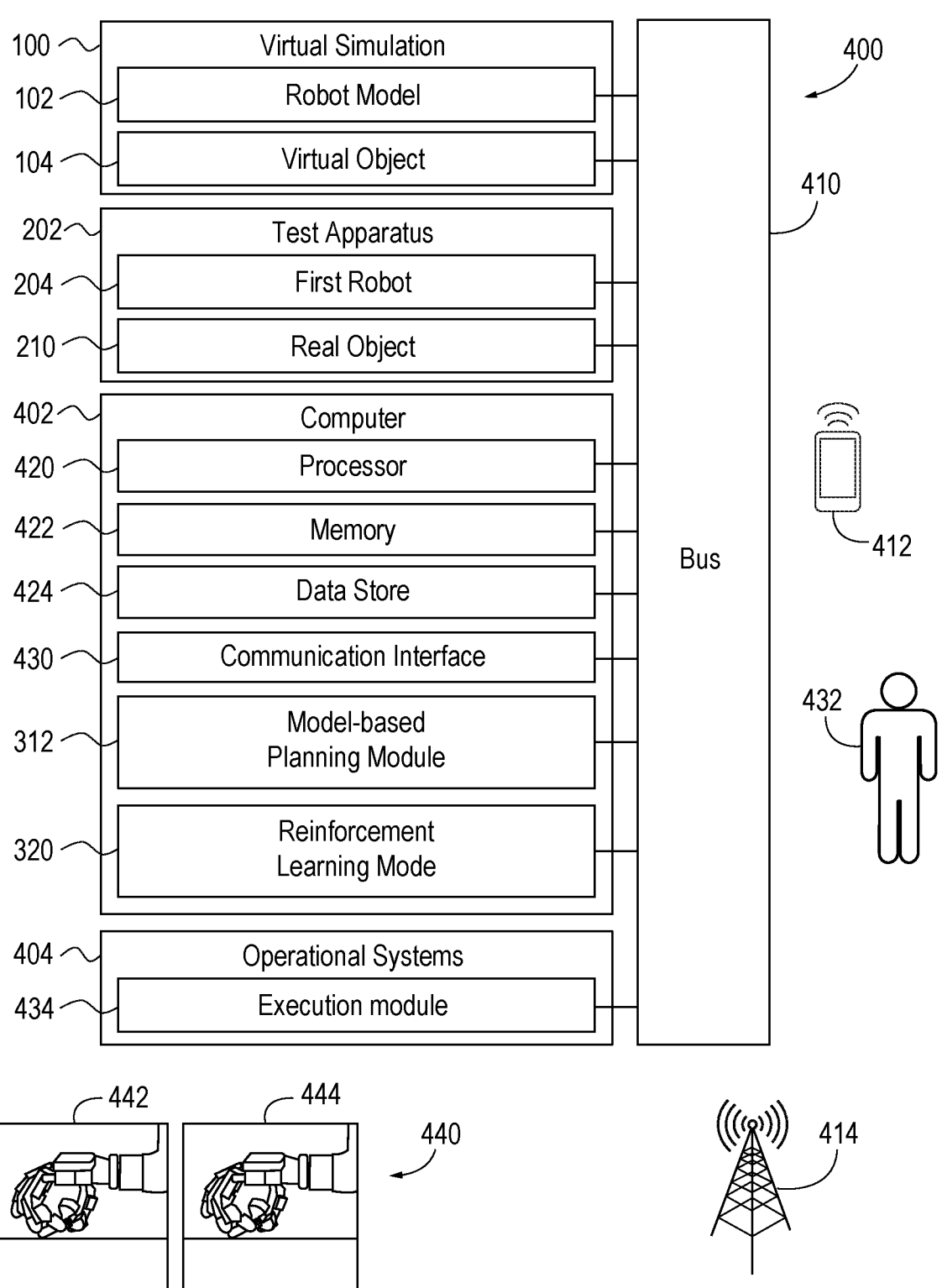
FIG. 8 is an exemplary operating environment of a system for dexterous manipulation by a robot.

FIG. 8 is an exemplary component diagram of an operating environment 400 for dexterous manipulation by a robot, according to one aspect. The operating environment includes the test apparatus 202, a computer 402, and operational systems 404. The test apparatus 202, the computer 402, and the operational systems 404 may be interconnected by a bus 410. The components of the operating environment 400, as well as the components of other systems, hardware architectures, and software architectures discussed herein, may be combined, omitted, or organized into different architectures for various embodiments. The computer 402 may be implemented with a device or remotely stored.

The computer 402 may be configured to execute the virtual simulation 100, implemented as a part of the test apparatus 202, and support elements of the learning framework 300. The computer 402 may be implemented as part of a telematics unit or an electronic control unit among other potential aspects of the test apparatus 202. In other embodiments, the components and functions of the computer 402 can be implemented with other devices such as a portable device 412, database, remote server, or another device connected via a network (e.g., a network 414).

The computer 402 may be capable of providing wired or wireless computer communications utilizing various protocols to send and receive electronic signals internally to and from components of the operating environment 400. Additionally, the computer 402 may be operably connected for internal computer communication via the bus 410 (e.g., a Controller Area Network (CAN) or a Local Interconnect Network (LIN) protocol bus) to facilitate data input and output between the computer 402 and the components of the operating environment 400.

The computer 402 includes a processor 420, a memory 422, a data store 424, and a communication interface 430, which are each operably connected for computer communication via the bus 410 and/or other wired and wireless technologies. The communication interface 430 provides software and hardware to facilitate data input and output between the components of the computer 402 and other components, networks, and data sources, which will be described herein.

The computer 402 is also operably connected for computer communication (e.g., via the bus 410 and/or the communication interface 430) to one or more operational systems 404. The operational systems 404 can include, but are not limited to, any automatic or manual systems that can be used to enhance the test apparatus 202, and facilitate operation of the test apparatus 202 by a user 432. The operational systems 404 include an execution module 434. The execution module 434 monitors, analyzes, and/or operates the test apparatus 202, to some degree. For example, the execution module 434 may store, calculate, and provide information about the test apparatus 202, such as previous usage statistics, including sensor data from previous use.

The operational systems 404 also include and/or are operably connected for computer communication to the test apparatus 202. For example, one or more sensors including the sensor 234 of the test apparatus 202 may be incorporated with the execution module 434 to monitor characteristics of the test apparatus 202 such as the pose and the position of the first robot 204, the real object 210, the floor 232 and other aspects of the test apparatus 202. In another embodiment, the test apparatus 202 may communicate with one or more devices or services (e.g., a wearable computing device, non-wearable computing device, cloud service, etc.) to perform simulations including the set of real simulations 200.

The test apparatus 202, the computer 402, and/or the operational systems 404 are also operatively connected for computer communication to and via the network 414. The network 414 is, for example, a data network, the Internet, a wide area network (WAN) or a local area (LAN) network. The network 414 serves as a communication medium to various remote devices (e.g., databases, web servers, remote servers, application servers, intermediary servers, client machines, or other portable devices).

With continued reference to FIG. 8, the operating environment 400 includes a plurality of robots 440 which include similar features and function in a similar manner as the first robot 204 with respect to manipulating an object. While, as depicted, the plurality of robots 440 includes a second robot 442 and a third robot 444, the plurality of robots 440 may include more or fewer robots similar to the first robot 204 without departing from the scope of the present disclosure.

Each robot in the plurality of robots 440 is configured to receive and execute a policy derived by the computer 402 for maneuvering the robot in a real world application. In this regard, the computer 402 is configured to deploy the policy 322 developed in the learning framework 300 to at least one robot in the plurality of robots 440 for real world applications in manipulating objects.

While, as depicted, the portable device 412 is a handheld computing device including a display with a graphic user interface for enabling the user 432 to provide instructions for directing a robot, the portable device 412 may additionally or alternatively include a wearable computing device corresponding to a robot. For example, the portable device 412 may include a data glove or a robotic glove worn by the user 432. With this construction, the data glove or the robotic glove correspond to a robotic hand configured for receiving instruction from the user 432, aided by the deployed policy.

As such, the operating environment 400 facilitates improved dexterous manipulation performance by a robot through developing and deploying a policy for maneuvering the robot that incorporates virtual data from a virtual simulation and sensor data from a real simulation. Detailed embodiments describing exemplary methods using the system and network configuration discussed above will now be discussed in detail.

II. Methods for Dextrous Manipulation by a Robot

Figure 9:
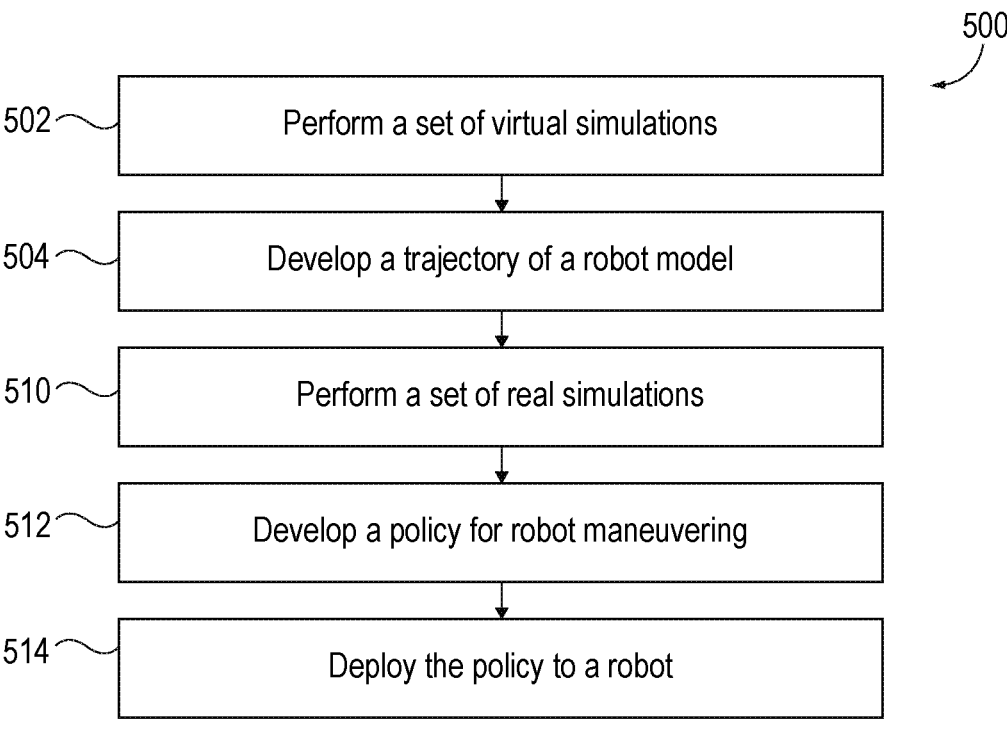
FIG. 9 is an exemplary process flow for dexterous manipulation by a robot.

Referring to FIG. 9, a method 500 for dexterous manipulation by a robot will be described according to an exemplary embodiment. FIG. 9 will be described with reference to FIGS. 1-8. For simplicity, the method 500 will be described as a sequence of blocks, but the elements of the method 500 can be organized into different architectures, elements, stages, and/or processes.

At block 502, the method 500 includes performing the set of virtual simulations 100 including the robot model 102 and the virtual object 104. Performing the set of virtual simulations 100 includes causing the robot model 102 to adopt the virtual target position from the virtual initial position. In an embodiment, both the virtual initial position and the virtual target position include the virtual robotic hand 112 gripping the virtual object 104, where at least one of the pose and the position of the virtual object 104 changes relative to at least one of the pose and the position of the virtual robotic hand 112 as the virtual robotic hand 112 moves from the virtual initial position toward the virtual target position.

At block 504, the method 500 includes developing the trajectory 314 of the robot model 102 based on the virtual simulation information 302 of the robot model 102 and the virtual object 104 generated in the set of virtual simulations 100. The virtual simulation information 302 indicates the sequential combination of the contact locations 134 on the virtual object 104 where the robot model 102 contacts the virtual object 104 as the robot model 102 adopts the virtual target position from the virtual initial position in the set of virtual simulations 100.

Developing the trajectory 314 of the robot model 102 in the set of virtual simulations 100 includes developing the trajectory 314 based on the virtual simulation information 302 with a model-based planner, such as the model-based planning module 312.

At block 510, the method 500 includes performing the set of real simulations 200 including the first robot 204, where the first robot 204 mimics the trajectory of the robot model 102. Performing the set of real simulations 200 includes causing the first robot 104 to mimic the trajectory and the sequential combination of contact locations 134 of the robot model 102 with the real object 210.

Performing the set of real simulations 200 also includes causing the first robot 204 to adopt the real target position from the real initial position. In an embodiment, the real target position and the real initial position both include the real robotic hand 214 gripping the real object 210, where at least one of a pose and a position of the real object 210 changes relative to a pose and a position of the real robotic hand 214 as the real robotic hand 214 moves from the real initial position toward the real target position.

At block 512, the method 500 includes developing the policy 322 for robot maneuvering based on the set of real simulations 200. The real simulation information 302 generated in the set of real simulations 200 indicates at least one of the pose and the position of the first robot 204, and at least one of the pose and the position of the real object 210. Developing the policy 322 for robot maneuvering includes developing the policy 322 based on the at least one of the pose and the position of the first robot 204 relative to the at least one of the pose and the position of the real object 210.

Developing the policy 322 for robot maneuvering includes employing a machine learning algorithm. The machine learning algorithm incorporates at least one of a first smoothness incentive structure that reduces an acceleration of the first robot 204 in the set of real simulations 200, a second smoothness incentive structure that reduces an acceleration of the first robot 204 in the set of real simulations 200, a distance incentive structure that reduces a distance between the first robot 204 and a real target position in the set of real simulations 200, a movement incentive structure that reduces movement of the first robot 204 in adopting the real target position from the real initial position, and a force incentive structure that reduces forces applied to the real object 210 by the first robot 204.

At block 514, the method 500 includes deploying the policy 322 to at least one of the first robot 204 and the second robot 442 to perform dexterous manipulation. In an embodiment, the method 500 includes deploying the second policy 322 to the portable device 412 for operation by the user 432.

Figure 10:
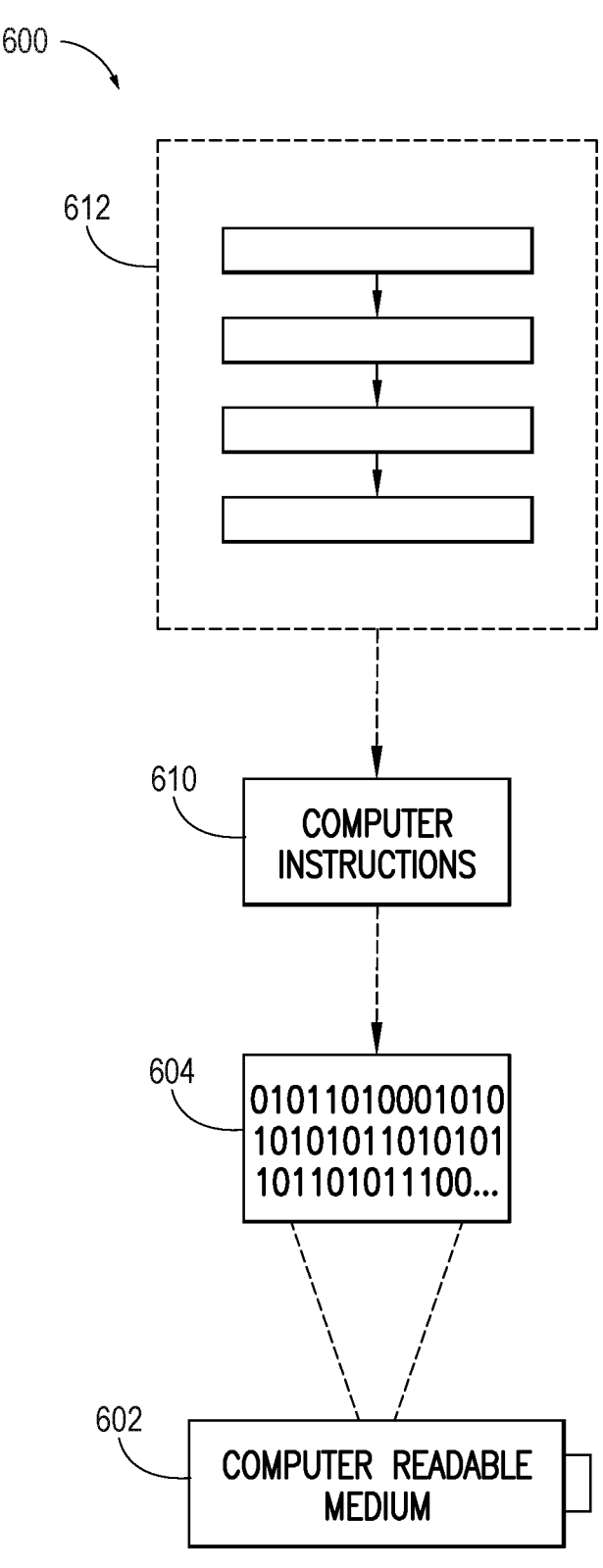
FIG. 10 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 10, where an implementation 600 includes a computer-readable medium 602, such as a CD-R, DVD-R, flash drive, a platter of a hard disk drive, etc., on which is encoded computer-readable data 604. This encoded computer-readable data 604, such as binary data including a plurality of zero's and one's as shown in 604, in turn includes a set of processor-executable computer instructions 610 configured to operate according to one or more of the principles set forth herein. In this implementation 600, the processor-executable computer instructions 610 may be configured to perform a method 612, such as the method 500 of FIG. 9. In another aspect, the processor-executable computer instructions 610 may be configured to implement a system, such as the operating environment 400 of FIG. 8. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that varieties of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for dexterous robot manipulation, the system comprising:

a first robot configured to perform real simulations with a real object; and at least one computer configured to:

perform a set of virtual simulations including a robot model and a virtual object corresponding to the first robot and the real object, and develop a trajectory of the robot model based on virtual simulation information of the robot model and the virtual object generated in the set of virtual simulations;

perform a set of real simulations including the first robot and the real object, wherein the first robot mimics the trajectory of the robot model, and develop a policy for robot maneuvering based on the set of real simulations; and deploy the policy to at least one of the first robot and a second robot to perform dexterous manipulation, wherein the first robot includes a real robotic hand, the robot model includes a virtual robotic hand corresponding to the real robotic hand, the virtual simulation information also indicates at least one of a pose and a position of the virtual robotic hand in the set of virtual simulations, and the at least one computer is configured to develop the policy based on at least one of a pose and a position of the real robotic hand in the set of real simulations.

2. The system of claim 1, wherein the virtual simulation information indicates a contact location on the virtual object where the robot model contacts the virtual object in the set of virtual simulations, and the at least one computer is configured to perform the set of real simulations such that the first robot mimics the trajectory and the contact location of the robot model with the real object.

3. The system of claim 1, wherein the virtual simulation information indicates a sequential combination of contact locations on the virtual object where the robot model contacts the virtual object as the robot model adopts a virtual target position from a virtual initial position in the set of virtual simulations, and the at least one computer is configured to perform the set of real simulations such that the first robot mimics the trajectory and the sequential combination of contact locations of the robot model with the real object.

4. The system of claim 1, wherein the virtual simulation information also indicates at least one of a pose and a position of the virtual object in the set of virtual simulations, and the at least one computer is configured to develop the policy based on the at least one of a pose and a position of the real robotic hand relative to the at least one of a pose and a position of the real object.

5. The system of claim 1, wherein the at least one computer is configured to employ a machine learning algorithm in developing the policy, wherein the machine learning algorithm incorporates a smoothness incentive structure that reduces an acceleration of the first robot in the set of real simulations.

6. The system of claim 5, wherein the at least one computer is configured to employ a machine learning algorithm in developing the policy, wherein the machine learning algorithm incorporates a smoothness incentive structure that reduces an acceleration of the real object in the set of real simulations.

7. The system of claim 1, wherein the set of real simulations includes the first robot adopting a real target position from a real initial position, and the at least one computer is configured to employ a machine learning algorithm in developing the policy, wherein the machine learning algorithm incorporates a distance incentive structure that reduces a distance between the first robot and the real target position in the set of real simulations.

8. The system of claim 1, wherein the set of real simulations includes the first robot adopting a real target position from a real initial position, and the at least one computer is configured to employ a machine learning algorithm in developing the policy, the machine learning algorithm including at least one of:

a movement incentive structure that reduces movement of the first robot in adopting the real target position from the real initial position; and a force incentive structure that reduces forces applied to the real object by the first robot.

9. The system of claim 1, wherein the at least one computer includes a model-based planner configured to develop the trajectory of the robot model in the set of virtual simulations.

10. The system of claim 1, wherein the robot model includes the virtual robotic hand, the set of virtual simulations includes the virtual robotic hand and the virtual object adopting a virtual target position from a virtual initial position in each iteration of the set of virtual simulations, wherein at least one of the virtual target position and the virtual initial position include the virtual robotic hand gripping the virtual object.

11. The system of claim 10, wherein the virtual target position and the virtual initial position both include the virtual robotic hand gripping the virtual object, wherein at least one of a pose and a position of the virtual object changes relative to a pose and a position of the virtual robotic hand as the virtual robotic hand moves from the virtual initial position toward the virtual target position.

12. The system of claim 1, wherein a real initial position of the first robot and the real object is randomized over the set of real simulations.

13. A method for dexterous robot manipulation, the method comprising:

performing a set of virtual simulations including a robot model and a virtual object, developing a trajectory of the robot model based on virtual simulation information of the robot model and the virtual object generated in the set of virtual simulations; performing a set of real simulations including a first robot, wherein the first robot mimics the trajectory of the robot model;

developing a policy for robot maneuvering based on the set of real simulations; and deploying the policy to at least one of the first robot and a second robot to perform dexterous manipulation, wherein the first robot includes a real robotic hand, the robot model includes a virtual robotic hand corresponding to the real robotic hand, the virtual simulation information also indicates at least one of a pose and a position of the virtual robotic hand in the set of virtual simulations, and the method includes developing the policy based on at least one of a pose and a position of the real robotic hand in the set of real simulations.

14. The method of claim 13, wherein the virtual simulation information indicates a sequential combination of contact locations on the virtual object where the robot model contacts the virtual object as the robot model adopts a virtual target position from a virtual initial position in the set of virtual simulations, and performing a set of real simulations includes causing the first robot to mimic the trajectory and the sequential combination of contact locations of the robot model with the real object.

15. The method of claim 13, wherein developing the trajectory of the robot model in the set of virtual simulations includes developing the trajectory based on the virtual simulation information with a model-based planner, wherein the virtual simulation information indicates a contact location on the virtual object where the robot model contacts the virtual object.

16. The method of claim 13, wherein the real simulation information indicates at least one of a pose and a position of the first robot, and at least one of a pose and a position of the real object in the set of real simulations, and developing the policy for robot maneuvering includes developing the policy based on the at least one of a pose and a position of the first robot relative to the at least one of a pose and a position of the real object.

17. The method of claim 13, wherein the method further comprises adding noise to the virtual simulation information, wherein developing the trajectory includes developing the trajectory based on the virtual simulation information with the added noise.

18. The method of claim 13, wherein developing the policy for robot maneuvering includes employing a machine learning algorithm that incorporates at least one of:

a first smoothness incentive structure that reduces an acceleration of the first robot in the set of real simulations;

a second smoothness incentive structure that reduces an acceleration of the first robot in the set of real simulations;

a distance incentive structure that reduces a distance between the first robot and a real target position in the set of real simulations;

a movement incentive structure that reduces movement of the first robot in adopting the real target position from a real initial position; and a force incentive structure that reduces forces applied to the real object by the first robot.

19. A non-transitory computer readable storage medium storing instructions that, when executed by a computer having a processor, causes the processor to perform a method, the method comprising:

performing a set of virtual simulations including a robot model and a virtual object, developing a trajectory of the robot model based on virtual simulation information of the robot model and the virtual object generated in the set of virtual simulations;

performing a set of real simulations including a first robot, wherein the first robot mimics the trajectory of the robot model;

developing a policy for robot maneuvering based on the set of real simulations; and deploying the policy to at least one of the first robot and a second robot to perform dexterous manipulation, wherein the first robot includes a real robotic hand, the robot model includes a virtual robotic hand corresponding to the real robotic hand, the virtual simulation information also indicates at least one of a pose and a position of the virtual robotic hand in the set of virtual simulations, and the method includes developing the policy based on at least one of a pose and a position of the real robotic hand in the set of real simulations.

* * * * *